United States Patent
Verteletskyi et al.

(10) Patent No.: US 12,354,025 B2
(45) Date of Patent: Jul. 8, 2025

(54) OCCUPANT DETECTION SYSTEMS

(71) Applicant: SPACETI LG LTD, London (GB)

(72) Inventors: Maksym Verteletskyi, Prague (CZ); Maksym Huk, Prague (CZ); Aakash Ravi, Stamford, CT (US); Ondrej Plevka, Prague (CZ); Tomas Bartak, Chrudim (CZ)

(73) Assignee: SPACETI LG LTD, London (GB)

( * ) Notice: Subject to any disclaimer, the term of this patent is extended or adjusted under 35 U.S.C. 154(b) by 0 days.

(21) Appl. No.: 18/092,896

(22) Filed: Jan. 3, 2023

(65) Prior Publication Data

US 2023/0409931 A1 Dec. 21, 2023

Related U.S. Application Data

(63) Continuation of application No. 16/684,443, filed on Nov. 14, 2019, now Pat. No. 11,544,592.

(51) Int. Cl.
*G06F 16/00* (2019.01)
*G06F 16/906* (2019.01)
*G06N 5/04* (2023.01)

(52) U.S. Cl.
CPC ............ *G06N 5/04* (2013.01); *G06F 16/906* (2019.01)

(58) Field of Classification Search
None
See application file for complete search history.

(56) References Cited

U.S. PATENT DOCUMENTS

| | | | |
|---|---|---|---|
| 8,646,936 B2 | 2/2014 | Goyal et al. | |
| 10,948,354 B2* | 3/2021 | Munir | F24F 11/30 |
| 11,448,413 B2* | 9/2022 | Bondalapati | G06F 3/167 |
| 11,495,111 B2* | 11/2022 | Song | G08B 7/06 |
| 2004/0260659 A1 | 12/2004 | Chan et al. | |
| 2007/0219711 A1 | 9/2007 | Kaldewey et al. | |
| 2008/0076346 A1* | 3/2008 | Ahmed | F24F 11/30 |
| | | | 454/256 |
| 2009/0201190 A1* | 8/2009 | Huthoefer | G08G 5/51 |
| | | | 342/36 |
| 2009/0237488 A1 | 9/2009 | Shudo | |
| 2011/0106573 A1 | 5/2011 | McNamara | |
| 2011/0231419 A1 | 9/2011 | Papke et al. | |

(Continued)

FOREIGN PATENT DOCUMENTS

EP 3121771 A1 1/2017

OTHER PUBLICATIONS

International Search Report and Written Opinion for PCT/GB2018/053542 filed Dec. 6, 2018, mailed Feb. 25, 2019, Applicant: Spaceti LG Ltd., ISA: European Patent Office, 17 pages.

(Continued)

*Primary Examiner* — Hasanul Mobin
(74) *Attorney, Agent, or Firm* — Perkins Coie LLP

(57) ABSTRACT

Systems and methods for processing occupancy of a space are described herein. The system determines real-time occupancy counts for monitored zones based on obtaining real-time data from various devices, such as sensors and/or user devices; grouping the data according to types of devices that provided the data; and calculating an occupancy count for each of the monitored zones based on integrating the data according to the groupings.

17 Claims, 5 Drawing Sheets

(56) References Cited

U.S. PATENT DOCUMENTS

| | | | |
|---|---|---|---|
| 2012/0029665 A1* | 2/2012 | Perry | H05B 47/115 |
| | | | 700/90 |
| 2014/0039713 A1 | 2/2014 | Hick et al. | |
| 2014/0107846 A1* | 4/2014 | Li | H04W 4/33 |
| | | | 700/275 |
| 2014/0239821 A1 | 8/2014 | Leonard | |
| 2014/0379305 A1 | 12/2014 | Kumar | |
| 2015/0006463 A1 | 1/2015 | Fadell et al. | |
| 2015/0046820 A1* | 2/2015 | Gazdzinski | G06Q 30/0265 |
| | | | 715/719 |
| 2015/0312696 A1 | 10/2015 | Ribbich | |
| 2015/0327010 A1 | 11/2015 | Gottschalk et al. | |
| 2015/0362927 A1 | 12/2015 | Giorgi | |
| 2016/0056629 A1 | 2/2016 | Baker et al. | |
| 2016/0110833 A1 | 4/2016 | Fix et al. | |
| 2016/0126733 A1 | 5/2016 | Hick et al. | |
| 2016/0300160 A1 | 10/2016 | Klein et al. | |
| 2017/0017214 A1 | 1/2017 | O'Keeffe | |
| 2017/0038787 A1 | 2/2017 | Baker et al. | |
| 2017/0070842 A1 | 3/2017 | Kulp et al. | |
| 2017/0124842 A1 | 5/2017 | Sudhi et al. | |
| 2017/0293807 A1* | 10/2017 | Mizes | H04N 7/181 |
| 2017/0316262 A1* | 11/2017 | Holliday | G06V 40/103 |
| 2017/0322534 A1 | 11/2017 | Sinha et al. | |
| 2017/0341746 A1 | 11/2017 | Erickson et al. | |
| 2017/0352257 A1 | 12/2017 | Oliver et al. | |
| 2017/0364817 A1 | 12/2017 | Rayvok et al. | |
| 2018/0143321 A1* | 5/2018 | Skowronek | G01S 17/66 |
| 2018/0211205 A1 | 7/2018 | Takemoto | |
| 2018/0218271 A1 | 8/2018 | Rao et al. | |
| 2018/0299845 A1* | 10/2018 | Ray | G05B 15/02 |
| 2019/0171171 A1 | 6/2019 | Verteletskyi et al. | |
| 2019/0172165 A1* | 6/2019 | Verteletskyi | H04L 69/08 |
| 2019/0360714 A1* | 11/2019 | Konrad | F24F 11/74 |
| 2024/0093901 A1* | 3/2024 | Pal | G05B 15/02 |

OTHER PUBLICATIONS

International Search Report and Written Opinion for PCT/GB2018/053543 filed Dec. 6, 2018, mailed Feb. 25, 2019, Applicant: Spaceti LG Ltd., ISA: European Patent Office, 16 pages.

Examiner Donald J. Edmonds, U.S. Patent Office Non-Final Office Action mailed Oct. 22, 2021 for U.S. Appl. No. 16/211,118, filed Dec. 5, 2018, first named Inventor: Maksym Verteletskyi, 21 pages.

International Search Report and Written Opinion for PCT/GB2020/052890 filed Nov. 13, 2020, mailed Feb. 9, 2021, Applicant: Spaceti LG Ltd., ISA: European Patent Office, 16 pages.

Written Opinion for Singaporean Application No. 11202204817X mailed Mar. 20, 2024, 7 pages.

Examination Report for European Application No. 20811062.7, mailed Dec. 19, 2023, 5 pages.

Intellectual Property India examination report issued Nov. 21, 2024 for Indian patent application No. 202227030864, 7 pages.

Notice to Grant issued for patent application No. 522432557 in Saudi Arabia on May 10, 2024.

Intellectual Property Office of Singapore Written Opinion for patent application No. 11202204817X, Jan. 1, 2025, five pages.

UAE Ministry of Economy Examination Report mailed Nov. 30, 2024 for patent application No. P6000887/2022, 5 pages.

* cited by examiner

OCCUPANT DETECTION SYSTEMS

TECHNICAL FIELD

This application is a continuation of U.S. patent application Ser. No. 16/684,443, filed Nov. 14, 2019, now issued as U.S. Pat. No. 11,544,592, which is incorporated by reference herein in its entirety.

TECHNICAL FIELD

The present invention relates to systems for monitoring and detecting locations of occupants within a given space, and in particular, but not exclusively, to an occupant detection system for detecting occupant locations relative to portions of a building.

BACKGROUND

In modern settings, buildings typically include several unconnected and/or stand-alone systems which sense different aspects of the building. For example, most buildings have one or more types of environmental sensors, such as thermal-sensors and/or thermostats for heating-ventilation and air-conditioning (HVAC) systems. Also, some buildings may have other types of sensors, such as cameras for security systems, wireless communication devices (e.g., routers or hubs), and/or entry-related sensors (e.g., human presence/contact sensors) for specific purposes.

However, these various task-based systems traditionally focus on individual and/or dedicated tasks without interacting with other systems. For example, HVAC systems perform their preprogrammed functions without regard to other systems, such as occupant systems used to identify occupant locations and/or occupancy information. As such, the deficiencies of these systems sometimes create unique issues.

Using occupant-locating systems as an example, a building may be equipped with line-crossing sensor systems to detect crossing events (e.g., ingress or egress of an occupant relative to a monitored space). However, such detectors often cannot account for simultaneous or substantially simultaneous crossing of multiple people and/or such detectors often fail to distinguish between people, animals, and/or objects (e.g., carts) in detecting ingress/egress events. The system may further utilize feature-recognition software, which is often very expensive to implement and/or to maintain, to analyze images from cameras and detect/identify people within the given space. However, such software/systems are susceptible to recognition/detection errors based on lighting conditions, line-of-sight issues, recognition/detection limits, degrees/amounts of motion in the received images, and/or other factors that increase the probability of errors. If the line-crossing sensors are implemented with camera-based feature-recognition software, the building system would receive two separate outputs (e.g., occupancy counts) that may conflict due to the above-described limitations of the individual measuring systems.

DETAILED DESCRIPTION

Figure 1:
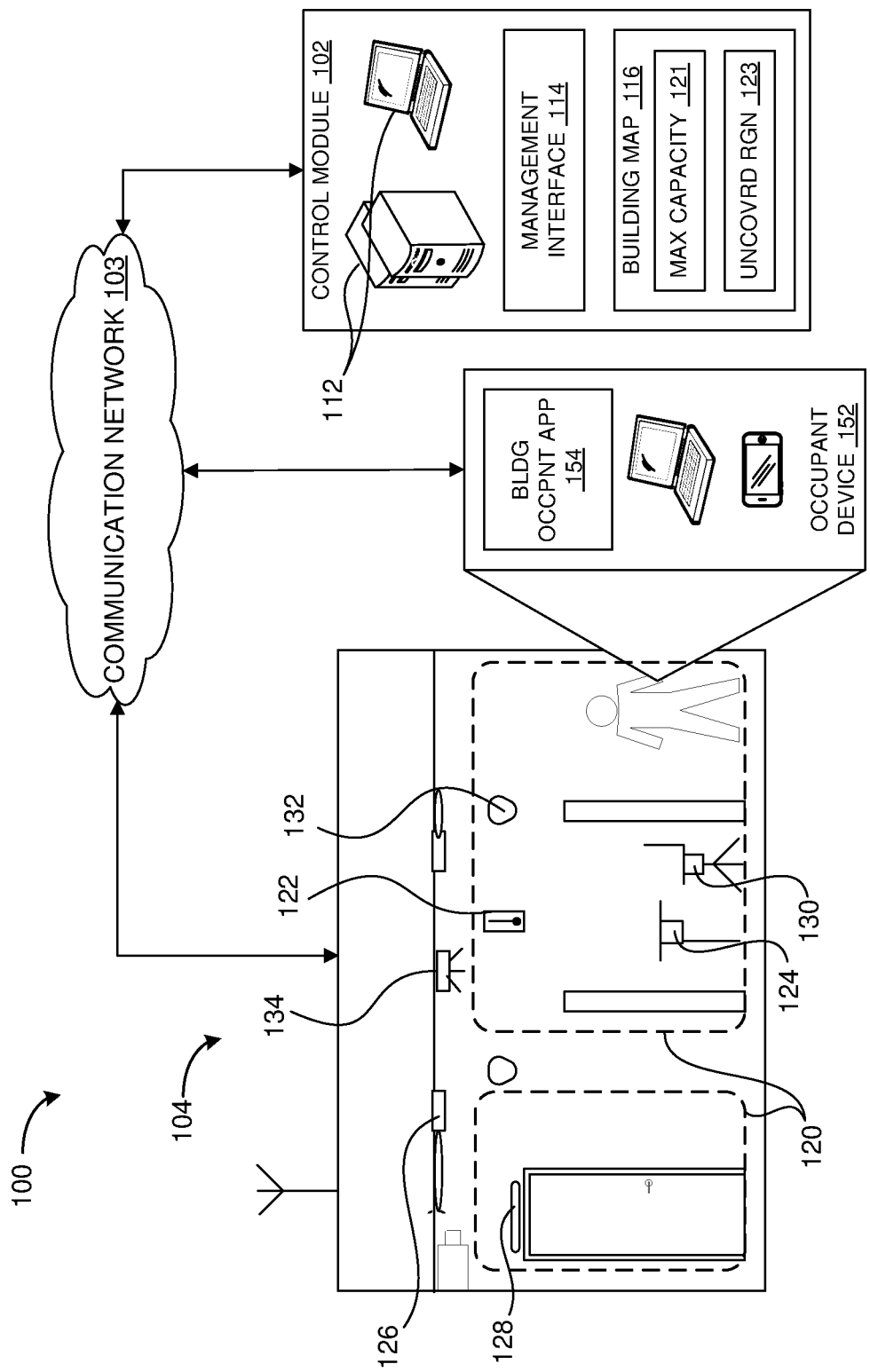
FIG. 1 is a schematic diagram of an example environment in which an occupant detection system may operate according to some embodiments of the present technology.

Systems and methods for detecting and tracking occupant data associated with occupants and/or objects, such as occupant/object locations and/or counts, within a space (e.g., within a structure, such as a building) are described herein. An occupancy detection system configured in accordance with some embodiments can detect and track occupants (e.g., people in an office space) and/or objects (e.g., cars in a parking structure) in real time or substantially real time (e.g., based on a refresh/update period on the order of seconds or minutes). In some embodiments, a management system can use the real-time locations and/or counts of the occupants and/or the objects within a space to control various building resources or subsystems, such as HVAC systems and/or security systems (e.g., for area entry or access). In some embodiments, for example, the management system can track locations and counts of animals on a farm or a boarding facility. Based on the tracked locations and/or counts, the management system can operate HVAC systems, lights, security systems (e.g., barriers), and/or other systems/devices for the farm or the boarding facility. In other embodiments, the management system can track locations and counts of vehicles in or on parking lots and/or vehicle transporters (e.g., ships, transport trucks, etc.). Based on the tracked vehicle locations and/or vehicle counts, the management system can operate indicators, lights, HVAC systems, and/or other systems/devices for the parking lots and/or the vehicle transporters. For one or more of the embodiments, the management system can track locations and/or counts based on processing and combining information from various types of devices (e.g., personal devices and/or vehicle sub-systems, visual or camera-based sensors, presence sensors, etc.). As described in detail below, the management system can combine data reported by mobile devices, cameras, presence sensors (e.g., line-crossing sensors, weight sensors, etc.), and/or other sensors to detect the presence/absence of various targets (e.g., people, objects, and/or animals) and a corresponding count thereof within monitored zones.

As noted above, conventional building management systems (BMSs) often include separate sensors and/or subsystems that have designated functions and lack the capacity to integrate and leverage measurements and/or status from different systems. As a result, failures or deficiencies of such systems remain separate, thereby increasing a total number of issues for conventional BMSs.

In contrast, embodiments of the occupancy detection system described below can integrate and leverage measurements and/or status from different devices and subsystems to generate new functions/results that can mitigate or eliminate one or more of the individual system/device deficiencies. The occupancy detection system can analyze and combine sensor outputs and/or device data from multiple different devices (e.g., environmental sensors, presence sensors, motion sensors, occupant devices, security system devices, and/or other subsystem devices) to determine occupancy counts. In some embodiments, the occupancy detection system can calculate occupancy counts relative to boundaries or zones, such as for offices or rooms, conference rooms, cubicle areas, lobbies, open spaces, and/or other spaces.

In some embodiments, the occupancy detection system can include and/or interact with a control module (e.g., a circuit, such as a processor and a memory including a set of instructions, and/or a software program), a set of sensors in the building, personal or mobile devices belonging to and/or carried by building occupants, and/or other internal or external systems. The control module can gather and integrate or combine various information from the interfacing systems, devices, and/or sensors, and determine occupant locations in real time or substantially in real time. In one or more embodiments, for example, the occupancy detection system can integrate (via, e.g., the control module) sensor data according to a processing category and/or a predetermined equation.

In some embodiments, the occupancy detection system can include and/or interact with one or more linking devices. The linking devices can be configured to directly interface with occupant devices and/or other sensors in a building. For example, the linking device can include, be integral with, and/or be connected to wired or wireless access nodes (e.g., wireless routers, network connectors, transceiver circuits, etc.) that communicate with occupant devices (e.g., smart phones, wearable devices, access keys, etc.). Also, the linking device can include circuitry, connections, instructions, etc. configured to interact with one or more sensors, such as accelerometers, magnetometers, gyroscopes, capacitive sensors, passive infrared (PIR) sensors, radars, mmWave sensors, light detection and ranging (lidar) devices, infrared (IR) transmitters/receivers, ultrasonic sensors, cameras, microphones, temperature sensors, humidity sensors, gas sensors (e.g., $CO_2$ sensor), or a combination thereof. For example, using one or more predetermined protocols, the linking device can communicate (via, e.g., wired and/or wireless connections) with one or more of the sensors located throughout the building, such as on walls, ceilings, ducts, etc., to control operations of the sensors and/or to obtain data (e.g., measurements and/or status) from the sensors.

By integrating data generated by multiple sensors and/or subsystem devices, the occupancy detection system can provide increased accuracy in locating the building occupants. For example, the occupancy detection system can detect and eliminate erroneous outputs/measurements from one or more of the sensors based on comparing data from other/multiple sources. Accordingly, in some embodiments, the occupancy detection system can increase the accuracy of occupant counts for designated areas within the building. The increased accuracy in locating the building occupants can further lead to improvements in resource (e.g., energy, occupancy space, furniture, and/or building-related resources) tracking and/or allocations.

Suitable Environments

FIG. 1 and the following discussion provide a brief, general description of an example suitable environment in which an occupancy detection system 100 according to some embodiments of the present technology may be implemented. Although not required, aspects of the invention are described in the general context of computer-executable instructions, such as routines executed by a general-purpose computer, a personal computer, a server, and/or other computing system. The invention can also be embodied in a special purpose computer or data processor that is specifically programmed, configured, and/or constructed to perform one or more of the computer-executable instructions described in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random-access memory (RAM), read-only memory (ROM), flash memory, or the like, or in a combination of such components. Computer-executable instructions may also be stored in one or more storage devices such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the invention can also be practiced in distributed computing environments (e.g., public, private, or hybrid clouds), where tasks or modules are performed by remote processing devices linked through a communications network including, but not limited to, a Local Area Network (LAN), Wide Area Network (WAN), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, or stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer while corresponding portions reside on a client computer.

Referring to the embodiment of FIG. 1, the occupancy detection system 100 in which aspects of the described technology may operate includes a control module 102 operably configured to interact with and/or manage one or more devices/systems in a building 104. The control module 102 can include circuitry (e.g., a processor connected to a memory) and/or software (e.g., instructions included in the memory) configured to track and manage various aspects/resources of the building 104 and interact with individual occupants and/or occupant devices, all in real time or substantially in real time. The control module 102 can be implemented via one or more system managing devices 112, such as a server, a general-purpose or specialized computer, and/or other computing device. In some embodiments, the control module 102 can be located at or near the building 104, at a remote location away from the building, and/or in a distributed computing environment. Further, in some embodiments, the control module 102 (e.g., one or more of the system managing devices 112) can be integral with a BMS.

The control module 102 can also include a system management interface 114 (e.g., a building management application, a graphical user interface (GUI), and/or other user interfacing mechanism) configured to allow building owners or administrative users to access and interact with the occupancy detection system 100. For example, the system management interface 114 can enable the building owners to access occupancy counts or a history thereof via the control module 102 (e.g., the system managing devices 112).

In some embodiments, the control module 102 can include or access one or more digital maps (e.g., a building map 116) of the building 104. The building map 116 can describe spaces within the building 104, and/or physical characteristics associated with the spaces. For example, the building map 116 can include locations of barriers (e.g., walls, doors, dividers columns, etc.), such as for rooms, offices, and/or cubicles. The building map 116 can also include locations and/or descriptions of sensors and/or other devices in the building 104.

In one or more embodiments, the building map 116 can indicate monitored zones 120 that represent spaces for occupancy. The monitored zones 120 can correspond to separate spaces that have their own purposes, boundaries, and/or access limitations. For example, the monitored zones 120 can correspond to offices, rooms, conference rooms, gathering areas, one or more cubicles, lobbies, elevator cars, open spaces, parking garages and/or parking spaces therein, and/or other spaces intended to be occupiable by one or more persons, objects, etc. In some embodiments, the building map 116 can further include one or more descriptions of the monitored zones 120. Some example descriptions of the monitored zones 120 can include maximum capacities 121 and/or uncovered regions 123 of the zones. The maximum capacities 121 can represent maximum numbers of occupants allowed in the corresponding monitored zones 120, and the uncovered regions 123 can represent portions within the corresponding monitored zones 120 that are not observed by associated devices (e.g., due to line of sight, device range or sensitivity, etc.). Other example descriptions can include a purpose, a type, a usage category, a name or an identifier, etc. for the monitored zones 120.

To monitor the zones 120, the control module 102 can be connected to sensors, such as environmental sensors, occupancy sensors, and/or other sensors of different categories. The sensors can operate via electro-mechanical/chemical devices that convert physical forces and/or conditions, such as electrical conductivity, chemical reactions, and/or received signal or an absence thereof, into electrical signals. Some examples of the sensors can include thermal sensors 122, presence sensors 124, motion sensors 126, line-crossing sensors 128, and/or position locators 130. The thermal sensors 122 can include devices configured to measure thermal energy (e.g., thermal/IR cameras, PIRs, thermometers, and/or thermostats). For example, the thermal sensors 122 can sense environmental/ambient temperatures, which can be affected by the number of people within the corresponding spaces. The presence sensors 124 can include devices configured to detect the presence of people and/or objects (via, e.g., using electrical conductivity to sense pressure/weight and/or skin contact or PIR/accelerometer/gyroscope to detect movement). For example, the presence sensors 124 can sense the pressure/weight on corresponding areas and/or furniture (e.g., chairs and/or at areas adjacent to corresponding desks). The motion sensors 126 can include devices configured to detect movement of people and/or objects (e.g., PIR devices, microwave or mmWave devices, vibration detectors, and/or ultrasonic devices). The line-crossing sensors 128 can include devices configured to detect people and/or objects crossing a monitored line/plane (e.g., laser and/or IR-based devices). Other examples of the sensors can include accelerometers, magnetometers, gyroscopes, capacitive sensors, PIRs, radars, mmWave sensors, lidar devices, IR transmitters/receivers, ultrasonic sensors, cameras, microphones, humidity sensors, and/or gas sensors.

In some embodiments, the sensors (e.g., sensors 122, 124, 126, 128, and/or 130) can be stationary, and the sensor locations can be represented in the building map 116 as described above. In other embodiments, some or all of the sensors can be moveable. For example, the presence sensors 124 can be attached to furniture, such as desks or chairs, that can be moved across different monitored zones 120. In one or more embodiments, the control module 102 can interact with the position locators 130 to locate the corresponding sensors and/or furniture.

In some embodiments, the occupancy detection system 100 can include or utilize one or more linking devices 132. The linking devices 132 include circuits configured to facilitate data collection, interfacing with the building occupants, and/or processing collected data. For example, as described in greater detail below, the linking devices 132 can include environmental and/or status sensors, such as: a temperature sensor, a humidity sensor, a carbon monoxide/dioxide sensor, other gas/organic compound sensors, a particulate matter sensor/detector, an ozone or radon sensor/detector, a noise detector or microphone, a light sensor, an occupant presence sensor (e.g., PIR sensors), a capacity sensor for sensing a load, a mmWave radar for distance measurements, a magnetic field sensor/detector, a barometric sensor, a hydrogen sensor, an ethanol sensor, a camera for imaging the surrounding environment, an accelerometer for detecting the device movements, a gyroscope for detecting the device orientation, or a combination thereof. Also, the linking devices 132 can include circuits (e.g., a wireless transmitter, receiver, router/modem, etc.) configured to provide wireless connections to one or more user devices 152 (e.g., smart phones, wearable devices, access keys, etc.) and/or provide an interface between the user devices 152 and the control module 102. Further, the linking devices 132 can include circuits configured to facilitate processes for locating wireless/mobile devices, such as by transmitting beacon signals, measuring or calculating signal strengths/delays/Doppler shifts/etc., interpolating or filtering the measurements (e.g., a Kalman filter to interpolate signal strength measurements), calculating distance based on the measured or calculated result, and/or performing multilateration. For example, the control module 102 can include a multilaterator, such as a Levenberg-Marquardt Multilaterator (LMM), a multilateration cycle queue (MCQ), etc. for locating the mobile devices.

In some embodiments, the control module 102 can be connected to communication nodes 134 (e.g., wireless routers, network connectors/ports) located in the building 104. The communication nodes 134 can in turn be connected to one or more devices/systems (e.g., the user devices 152, the subsystems in the building, etc.) via a communication network 103, such as a wired or wireless network, a telephone network, the Internet, a cellular network, etc. As such, in one or more embodiments, the control module 102 can communicate with the one or more devices/systems in the building 104 via the communication nodes 134. Also, the control module 102 can communicate with one or more devices/systems via direct links (via, e.g., direct wired and/or wireless connections, peer-to-peer communication protocols, such as near-field communication (NFC) or Bluetooth, etc.). In some embodiments, as described above, the linking devices 132 can include the communication nodes 134 or functionalities thereof.

As described above, in some embodiments, the control module 102 can interface with individual occupants of the building 104. For example, the control module 102 can communicate with the user devices 152 (e.g., smartphones, wearable devices, laptops, etc.) belonging to or operated by the occupants. The user devices 152 can include or access building occupant application 154 (e.g., software applications, GUI, etc.) configured to enable the occupants to interact with the control module 102 via their devices.

System Components

Figure 2:
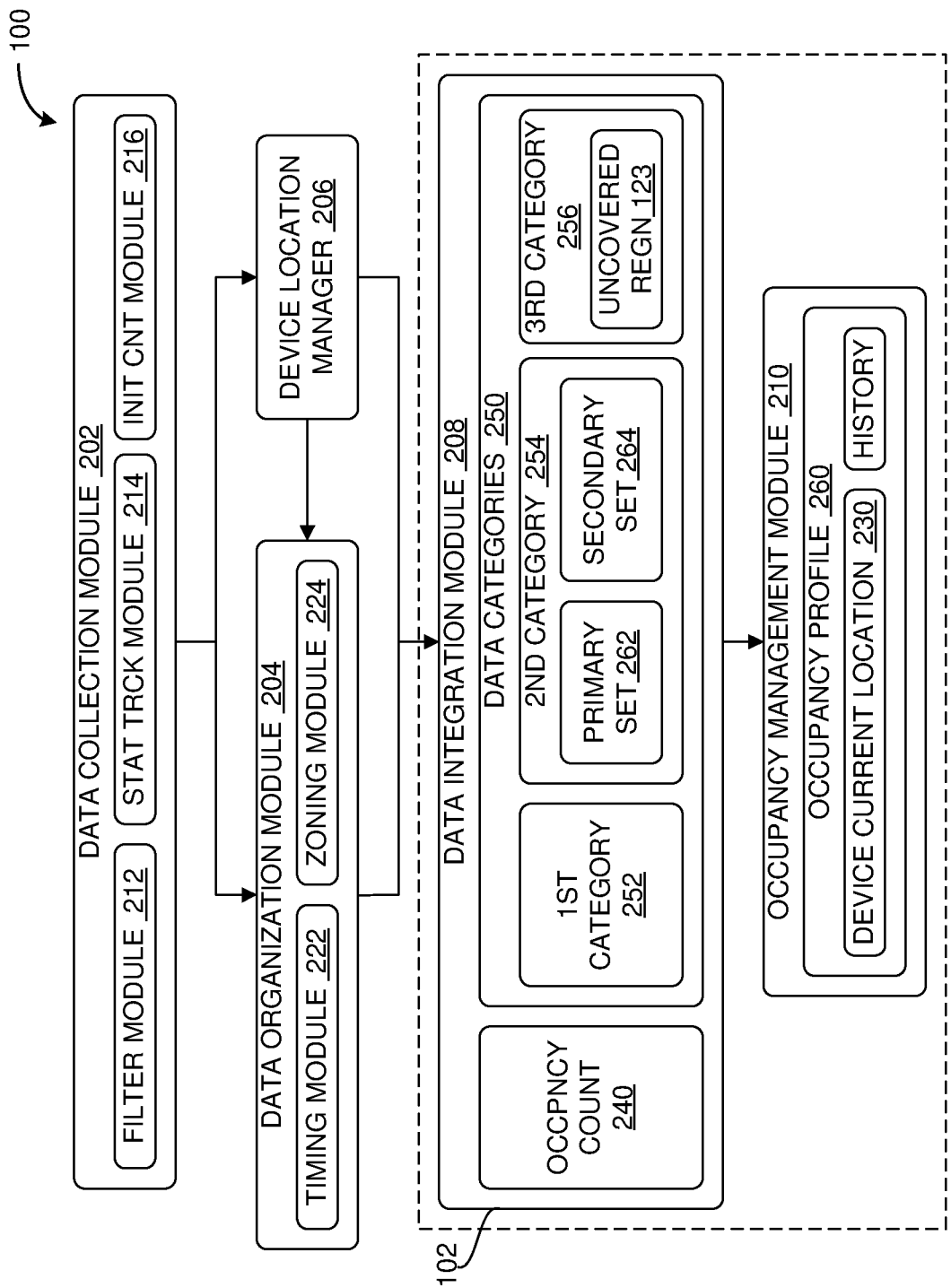
FIG. 2 is a block diagram of the occupant detection system configured in accordance with some embodiments of the present technology.

FIG. 2 is a block diagram illustrating various components (e.g., software components, modules, and/or circuits) of the occupancy detection system 100 configured in accordance with some embodiments of the present technology. In some embodiments, the occupancy detection system 100 can include a data collection module 202, a data organization module 204, a device location manager 206, a data integration module 208, and/or an occupancy management module 210 implemented in software and/or firmware. The components of the occupancy detection system 100 can be operatively connected to each other, such as through function calls, communication protocols, wired and/or wireless connections, etc.

One or more of the components of the occupancy detection system 100 can be included in or executed by the control module 102 and/or one or more interfaces or APIs implemented on the user devices 152. For example, one or more of the components can be stored in memory components, executed by one or more processors, and/or implemented by specialized circuits on the system managing devices 112, the user devices 152, the linking devices 132, one or more of the sensors illustrated in FIG. 1, and/or other devices. As illustrated in FIG. 2, the control module 102 can implement at least the data integration module 208 and/or the occupancy management module 210. In some embodiments, the control module 102 can also implement the data collection module 202, the data organization module 204, the device location manager 206, a portion thereof, or a combination thereof. In other embodiments, the data collection module 202, the data organization module 204, the device location module 206, one or more portions thereof, or a combination thereof can be implemented using the building occupant application 154 of FIG. 1 and/or the linking devices 132. In some embodiments, the user devices 152, the system managing devices 112, and/or the linking devices 132 can implement the device location manager 206 or portions thereof.

The data collection module 202 can be configured to obtain data (e.g., sensor measurements and/or device status) in real time or substantially real time from one or more devices (e.g., the sensors 122, 124, etc. and/or the user devices 152 illustrated in FIG. 1) in the building 104 of FIG. 1. In some embodiments, the data collection module 202 can prompt or query one or more devices (e.g., the sensors 122, 124, etc. and/or the user devices 152) to send measurement and/or status data to the control module 102. In some embodiments, the data collection module 202 can include signal detection circuits that detect electrical/wireless signals and/or signal decoders that extract encoded information from signals from one or more of the sensors 122, 124, etc. and/or the user devices 152.

In some embodiments, the data collection module 202 can include a filter module 212 configured to initially analyze data for values, conditions, and/or trends. For example, the filter module 212 can initially validate the data, such as by removing signal noise from the received signals, detecting/removing false values in the decoded data (based on, e.g., detecting rapid changes in value exceeding one or more thresholds), adapting the baseline for some types of sensors and/or removing signal variations corresponding to one or more frequency ranges in the received signals. Also, the filter module 212 can be used to compare the data from the sensors 122, 124, etc. and/or the user devices 152 to thresholds that represent certain conditions, such as false readings and/or emergency situations (e.g., predetermined levels/values characteristic of unsafe gas/temperatures levels and/or building fires). Also, the filter module 212 can be used to recognize trends in the received data. The filter module 212 can, for example, recognize temporal trends by identifying template patterns in a recent dataset from one or more of the sensors and/or combinational or cause-and-effect trends by identifying template patterns in a set of current data from a predetermined set of sensors. In one or more embodiments, the filter module 212 can initially analyze data from environmental/ambient condition sensors described above.

In some embodiments, the data collection module 202 can include a status tracking module 214 to store and track conditional data (e.g., Boolean values and/or optional data) from one or more of the sensors 122, 124, etc. For example, the status tracking module 214 can store and track Boolean occupancy status from the presence sensors 124 of FIG. 1 and/or the motion sensors 126 of FIG. 1. In one or more embodiments, the status tracking module 214 can map the received occupancy status to corresponding locations in the building 104 (e.g., the monitored zones 120 of FIG. 1) and/or to objects (e.g., chairs and/or desks). Also, the status tracking module 214 can store and track data used to position/locate the corresponding objects, such as for received signal strength indicator (RSSI) measurements associated with the position locators 130 of FIG. 1. Details regarding the position computation are discussed below.

In some embodiments, the data collection module 202 can include an initial count module 216 configured to estimate and/or track occupancy counts 240 associated with one or more sensors. For example, the initial count module 216 can store and track values or events from the line-crossing sensors 128 as estimates of the occupancy counts 240 for associated monitored zones 120. Also, the initial count module 216 can process images and/or distances (e.g., depth maps) from cameras, radars, lidar devices, etc. to estimate the occupancy counts 240. In processing such data, the initial count module 216 can implement computer vision mechanisms to identify/distinguish individual persons and/or objects based on recognizing patterns and/or features in the data. For example, the initial count module 216 can analyze the images and/or the depth maps to detect predetermined patterns that represent human physical features (e.g., facial features, body outlines, etc.). The initial count module 216 can estimate the occupancy counts 240 according to a quantity of detected patterns within the images and/or the depth maps.

Outputs of the data collection module 202 (e.g., received/filtered data, occupancy estimates, trends/patterns thereof, and/or associated thresholding events described above) can be received and further processed by the data organization module 204. The data organization module 204 can be configured to group received data based on one or more parameters. For example, the data organization module 204 can include a timing module 222 configured to group asynchronously sampled/received data according to its timing. In one or more embodiments, the timing module 222 can sort, synchronize, and/or group the measurement/status data from the different devices (e.g., the sensors 122, 124, etc. and/or the user devices 152) according to timestamps associated with the received measurements/events. Also, as another example, the data organization module 204 can include a zoning module 224 configured to group the data according to one or more predetermined zones (e.g., the monitored zones 120). For example, the zoning module 224 can include predetermined groupings that identify the stationary instances of the sensors 122, 124, etc. within each of the monitored zones 120. In one or more embodiments, the zoning module 224 can compare, in real time after receiving the data, identifiers of the reporting devices to the building map 116 of FIG. 1 and identify the corresponding/surrounding monitored zones 120 to determine the groupings. The zoning module 224 can use the identifiers of the reporting device to group the received data (i.e., outputs of the data collection module 202) according to the determined device groupings. Accordingly, the data organization module 204 can identify sets of data that are measured/received simultaneously or within a predetermined duration and/or sets of data that correspond to the same areas.

Similar to the data organization module 204, the device location manager 206 can access and process the outputs of the data collection module 202. The device location manager 206 can be configured to calculate current locations 230 for devices (e.g., the user devices 152 and/or the position locators 130) located in the building 104. The device location manager 206 can calculate the current location 230 using multilateration and/or dead-reckoning based on measurements (e.g., the RSSI measurements and/or accelerometer readings) associated with each of the devices (e.g., the user devices 152 and/or the position locators 130) and/or prior knowledge of the building environment (e.g., the building map 116 including floor plans, location of linking devices, communication nodes, and/or sensors, etc.). As an illustrative example, the occupancy detection system 100 can include one or more beacon transmitters that transmit beacon signals (via, e.g., Bluetooth protocol). In some embodiments, the beacon transmitters can be included within the linking devices 132 and/or communication nodes 134 of FIG. 1 that are located at static/known locations. The beacon signals can be detected and measured (as, e.g., RSSI measurements) by receivers. In some embodiments, the receivers can be included in the user devices 152 and/or the position locators 130 that measure the beacon signals and report the measurements to the data collection module 202. In other embodiments, the beacon transmitters can be included in the user devices 152 and/or the position locators 130, and the receivers can be included in devices (e.g., the linking devices 132 and/or communication nodes 134) located at static/known locations.

The device location manager 206 can use the RSSI measurements and/or their filtered results to calculate the current location 230 of the corresponding device. In some embodiments, the device location manager 206 can include a multilateration mechanism (e.g., a Levenberg-Marquardt Multilaterator (LMM)) configured to locate the user device based on the received measurements (e.g., the RSSI values). In calculating the current location 230, the device location manager 206 can access the building map 116 to locate the static reference devices (e.g., the beacon sources and/or signal receivers). Using the measurements (e.g., the RSSI and/or the measured propagation delay), the multilateration mechanism can calculate distances between the beacon transmitters and the receivers. For each device, the multilateration mechanism can calculate the current location 230 as the location that matches the calculated distances from the corresponding reference devices.

The data integration module 208 can access and process data from the data collection module 202, the data organization module 204, the device location manager 206, or a combination thereof. The data integration module 208 can be configured to combine the data from various types of sensors and derive a smaller set of results. As described in detail below, the data integration module 208 can derive the occupancy counts 240 for the monitored zones 120 based on integrating data from multiple different types/instances of devices. Also, the data integration module 208 can derive the occupancy counts 240 according to the monitored zones 120 (according to, e.g., predetermined zones within the building 104 and/or purposes associated with the zones).

As described in detail below, the data integration module 208 can derive the occupancy counts 240 based on data categories 250 that group data according to one or more characteristics (e.g., accuracy, granularity, and/or category) of the sourcing device. For example, the data categories 250 can categorize the sensor measurements into groups (e.g., a first category 252, a second category 254, and/or a third category 256) according to the one or more characteristics of the sourcing device.

Some examples of data for the first category 252 can be from devices associated with individual occupants, such as the user devices 152 and/or the personalized instances of the presence sensors 124 of FIG. 1 (e.g., sensors configured to detect presence/absence of one person, such as on a chair or at a desk). In some embodiments, the first category 252 can include data from personal devices, mobile devices, keys, badges, and/or sensors on desks/chairs. Examples of the data for the second category 254 can be from more public or zone related devices, such as the presence sensors 124, the motion sensors 126 of FIG. 1, environmental and/or ambient sensors, or a combination thereof reporting Boolean or abstract occupancy status of areas or zones. In some embodiments, the second category 254 can include data from the thermal sensors 122 of FIG. 1, the gas/particle sensors, the humidity sensors, the microphones, PIR, or a combination thereof. In one or more embodiments, the second category 254 can further include a primary set 262 and a secondary set 264 that are differentiated according to a threshold, limit, and/or categorization associated with sensitivities and/or delay times for the reporting devices. For example, the primary set 262 can include data from devices (e.g., PIR sensors and/or microphones) that can detect occupancy changes within a relatively short (e.g., one or more minutes or less than a minute) threshold duration. The secondary set 264 can include data (e.g., temperature, humidity, and/or $CO_2$ or other particle levels) that requires more than the threshold amount of time to update in response to occupancy changes. Examples of data in the third category 256 can be from public or zone-related devices that report a more precise number and/or status of occupants in the area. For example, in some embodiments, the third category 256 can include data from the cameras, the radars, and/or the line-crossing sensors 128 of FIG. 1.

In some embodiments, the occupancy management module 210 can access and process data (e.g., the occupancy counts 240) from the data integration module 208. In some embodiments, the occupancy management module 210 can be configured to oversee or track information associated with occupants of the building 104. For example, the occupancy management module 210 can maintain an occupancy profile 260 that corresponds to occupants in one or more of the monitored zones 120. The occupancy profile 270 can include various data (e.g., the occupancy counts 240, the current locations 230, and/or historical record thereof) associated with occupancy of the corresponding areas in the building 104.

Linking Devices

Figure 3:
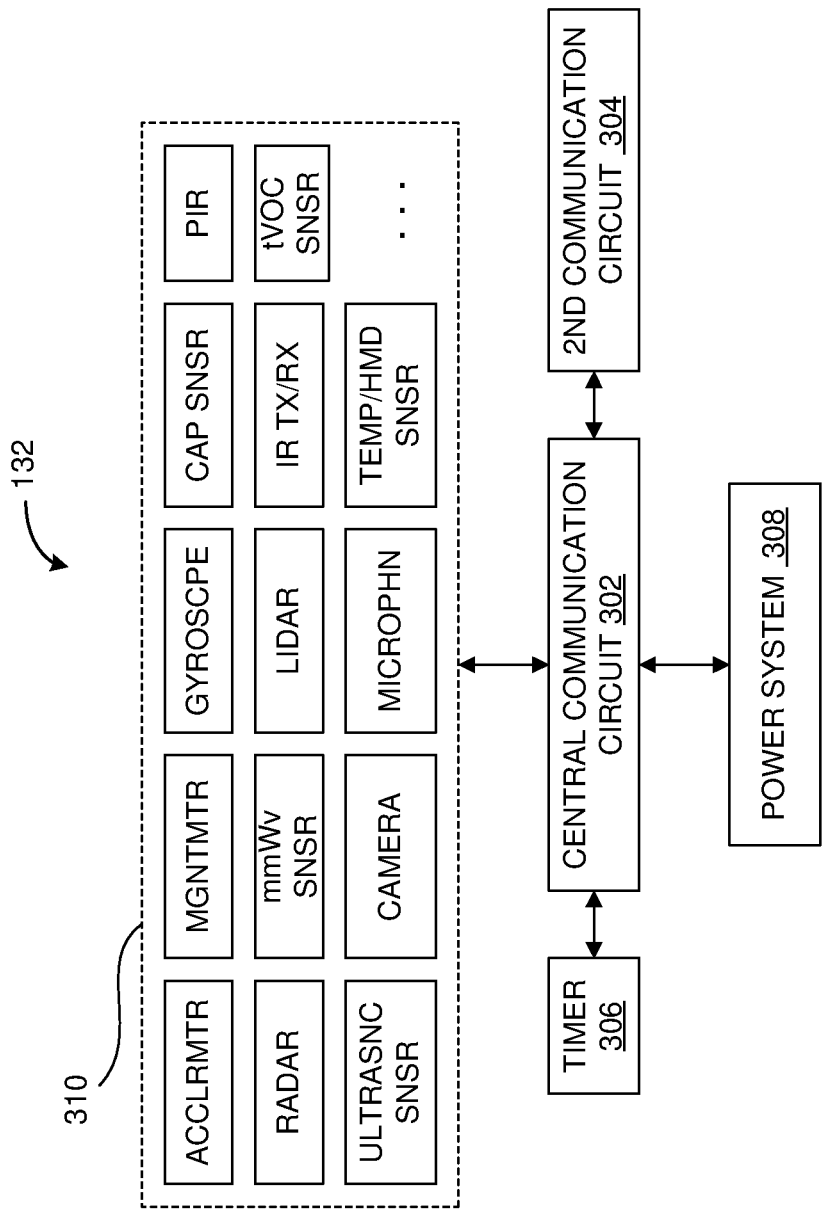
FIG. 3 is a block diagram of a linking device configured in accordance with some embodiments of the present technology.

FIG. 3 is a block diagram of the linking device 132 configured in accordance with some embodiments of the present technology. The linking device 132 can include one or more circuits configured to provide an interface between various devices/systems for the occupancy detection system 100 of FIG. 1. In some embodiments, the linking device 132 can be a surface-mount device including an attachment mechanisms (e.g., a mounting portion including an adhesive, a nail, a screw, a cable tie, another type of fastener, etc.) configured to attach the linking device 132 to a surface of a structure (e.g., a wall, a column, a ceiling, a column, a divider, a floor, etc.) in or of the building 104 of FIG. 1.

In some embodiments, the linking device 132 can include a central communication circuit 302 connected to a second communication circuit 304, a timer circuit 306, a power system 308, one or more sensors 310, or a combination thereof. In some embodiments, the circuits 302-310 can be interconnected using UART connections/buses, direct communication connections (e.g., traces on printed circuit boards), a serial peripheral interface (SPI), an inter-integrated circuit (I2C) communication, and/or other circuit-to-circuit or device-to-device communication mechanisms.

The central communication circuit 302 can include, e.g., a processor, onboard memory, a transmitter, a receiver, etc., and can be configured to provide an interface between the control module 102 of FIG. 1 and one or more of the sensors 122, 124, etc. and/or the user devices 152 in the building 104. For example, the central communication circuit 302 can provide the above-mentioned interface based on translating communicated commands, signals, information, etc. from a source format (e.g., formats/protocols for the communicated data) to a destination format recognized by the receiving module/sensor/device. In some embodiments, the central communication circuit 302 can include a sub-GHz communication circuit, one or more antenna, an Ethernet port/circuit, a wireless LAN connector/circuit, etc. for facilitating the communication between the devices/systems. The central communication circuit 302 can provide initial processing and/or internal control of one or more of the circuits 302-310.

The second communication circuit 304 can be configured to provide an interface between the central communication circuit 302 and one or more devices in the building 104. In other words, the second communication circuit 304 can connect legacy or previously stand-alone systems in the building 104 to the control module 102. In some embodiments, the second communication circuit 304 can communicate with other devices in the building 104 via direct wire connections and/or wireless communication interfaces (e.g., Bluetooth, wireless LAN, etc.). The second communication circuit 304 can provide the interface by mapping commands, signals, information, etc. according to source and destination formats as described above. In some embodiments, the second communication circuit 304 can broadcast the beacon signals used for locating other devices as described above.

The timer circuit 306 can be configured to facilitate an operating cycle for the linking device 132. The timer circuit 306 can provide an interrupt at one or more predetermined intervals (e.g., various timing/accuracy modes) for operating one or more circuits in the linking device 132. For example, the timer circuit 306 can provide an interrupt signal every few minutes (e.g., 15 minutes) that initiates one or more of the sensors 310 to measure and/or report measurements/status. In some embodiments, the functions of the timer circuit 306 can be included in or shared with other circuits, such as the sensors 310. For example, the sensors 310 onboard the linking device 132 can generate the interrupt in standby mode to initiate reporting of the sensor measurements. As an illustrative example, one or more of the sensors 310 can be configured (via, e.g., a coarser measurement circuit, a breaker, and/or a reduced sampling frequency) to sense the environment for one or more extreme/threshold conditions while in standby mode. When the sensor detects an extreme condition (e.g., a fire as represented by a temperature reading or a gas level exceeding a corresponding threshold), the sensor can generate the interrupt to initiate the reporting process.

The power system 308 can be configured to power the circuits within the linking device 132. In some embodiments, the power system 308 can include one or more batteries or a connection to a building power system, a power control circuit (e.g., a voltage regulator), etc.

The sensors 310 can be configured to determine corresponding environmental conditions in the building 104. In some embodiments, the sensors 310 can include the devices illustrated in FIG. 1, such as the thermal sensors 122, the presence sensors 124, etc. Other examples of the sensors 310 can include accelerometers, magnetometers, gyroscopes, capacitive sensors, PIRs, radars, mmWave sensors, lidar devices, IR transmitters/receivers, ultrasonic sensors, cameras, microphones, temperature sensors, humidity sensors, gas or particle sensors (e.g., $CO_2$ and/or VoC sensors), or a combination thereof. In some embodiments, the linking device 132 can include a modular design that can be configured to include a different combination of sensors, communication circuits, etc.

Example Routines for an Occupant Detection System

Figure 4:
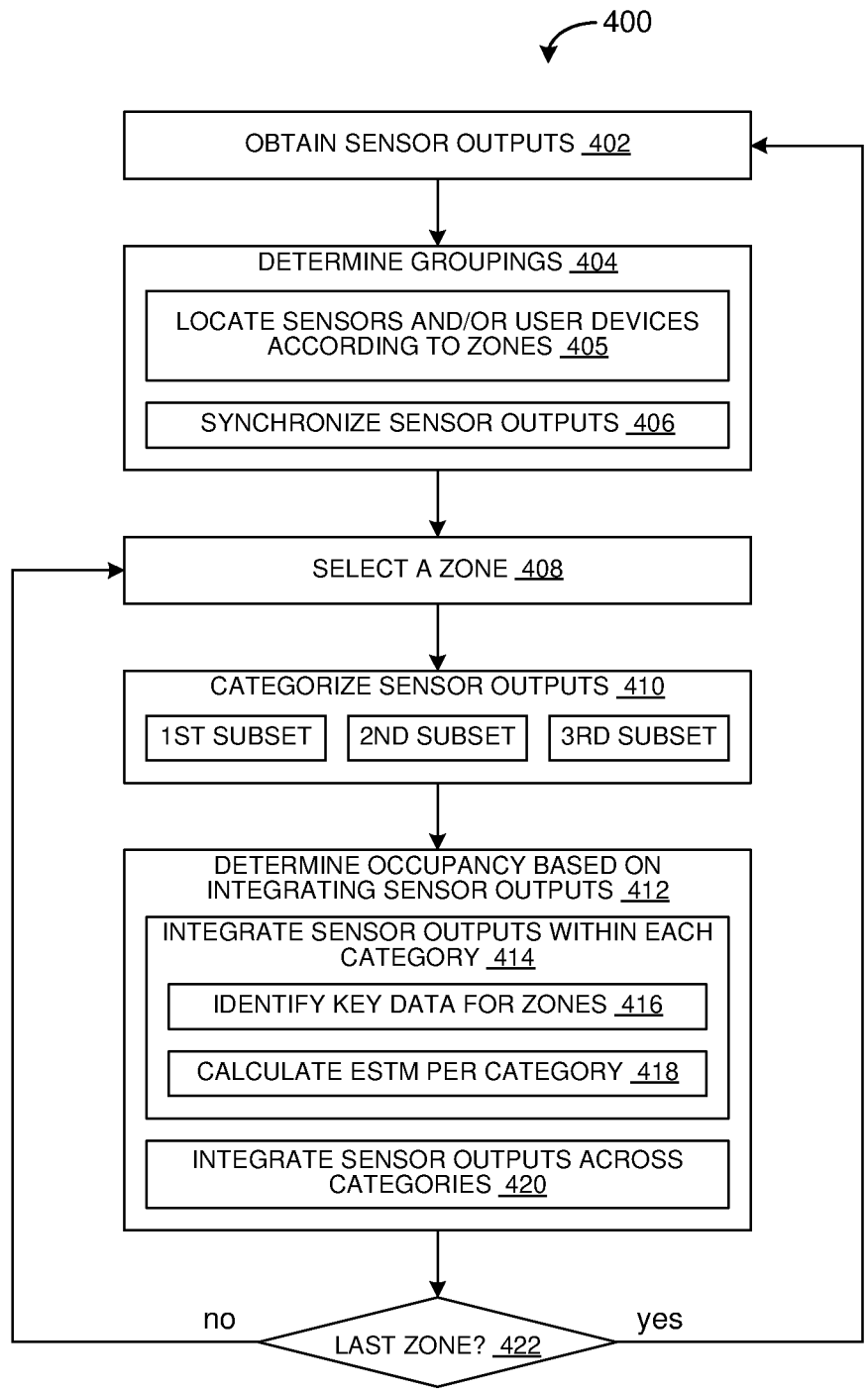
FIG. 4 is a flow diagram illustrating an example process for implementing an occupant detection system according to some embodiments of the present technology.

FIG. 4 is a flow diagram illustrating an example process 400 for implementing an occupancy detection system (e.g., the occupancy detection system 100 of FIG. 1 or a portion thereof) according to some embodiments of the present technology. The process 400 can be implemented via one or more of the devices illustrated in FIG. 1, such as the user devices 152, the system managing devices 112, the linking devices 132, or a combination thereof. The process 400 can be implemented using the software and/or firmware modules/components illustrated in FIG. 2, the various sensors, and/or the control module 102 of FIG. 1, or a combination thereof.

At block 402, the occupancy detection system 100 can obtain (via, e.g., the data collection module 202 of FIG. 2) data (e.g., location information, measurements, reporting-device identification, associated time stamps, device status, and/or other device-specific results) from one or more of the sensors 122, 124, etc., the user devices 152, and/or other devices located within the building 104 of FIG. 1. The occupancy detection system 100 can obtain the data based on querying and/or receiving communications from one or more of the devices (e.g., devices illustrated in FIG. 1) communicably coupled to the system managing devices 112 of FIG. 1 and/or the linking devices 132 of FIG. 1. For example, the data can be obtained from the thermal sensors 122, the presence sensors 124, the motion sensors 126, the line-crossing sensors 128, the position locators 130, and/or the user devices 152. Other examples of the reporting devices can include environmental or ambient sensors, mobile devices, and/or furniture/object related sensors (e.g., sensors that are on chairs and/or desks). In some embodiments, the data can be communicated between the devices continuously, such as via a data stream. In other embodiments, the data can be communicated according to a frequency or a timing.

At block 404, the occupancy detection system 100 can group (via, e.g., the data organization module 204 and/or the device location manager 206 illustrated in FIG. 2) the obtained data (e.g., sensor outputs) according to one or more associated aspects, such as time and space. At block 405, the occupancy detection system 100 can locate the sensors 122, 124, etc. and/or the user devices 152 according to zones (e.g., spaces/areas). The occupancy detection system 100 can compute the current location 230 of FIG. 2 as described above and compare the current location 230 to boundaries of the monitored zones 120 of FIG. 1. Based on the comparison, the occupancy detection system 100 can identify the sensors 122, 124, etc. located in each of the monitored zones 120 and group the sensor outputs accordingly. In other words, the occupancy detection system 100 can group together measurements/status from the sensors 122, 124, etc. that represents conditions and/or events for each of the monitored zones 120. For example, the occupancy detection system 100 can group the sensor outputs for each personal space (e.g., an office and/or a cubicle), conference room, kitchen, cafeteria, and/or event space (exhibit/gathering halls, ballrooms, etc.).

At block 406, the occupancy detection system 100 can synchronize the sensor measurements/status. In some embodiments, the occupancy detection system 100 can synchronize the sensor outputs based on sorting the obtained sensor outputs according to the associated time stamps that represent time of measurement/event and/or time of report. The occupancy detection system 100 can also group the sensor outputs according to common time stamps and/or time stamps that correspond to predefined durations (e.g., N-minute increments). In other words, the occupancy detection system 100 can identify the data associated with events/conditions occurring at the same time or within a predetermined duration.

In some embodiments, the occupancy detection system 100 can implement the synchronization illustrated at block 406 after the zone-based locating process illustrated in block 405. Accordingly, the occupancy detection system 100 can synchronize the sensor outputs that were generated within each of the monitored zones 120. In other embodiments, the occupancy detection system 100 can implement the zone-based locating process illustrated in block 405 after the synchronization in block 406.

At block 408, the occupancy detection system 100 can select (via, e.g., the data integration module 208 of FIG. 2) a zone (e.g., one of the monitored zones 120) for computing the associated occupancy count 240 of FIG. 2. In some embodiments, the occupancy detection system 100 can select the zone iteratively and/or according to a predetermined pattern/sequence for the zones.

For the selected zone, the occupancy detection system 100 can determine/identify one or more parameters, such as the maximum capacity 121 and/or the uncovered regions 123 illustrated in FIG. 1. Other examples of the related parameters can include other descriptions, such as a purpose, a type, and/or a usage category, for the monitored zones 120. In some embodiments, for example, the occupancy detection system 100 can determine/identify the one or more related parameters based on accessing and/or searching the building map 116 and/or other predetermined descriptions of the monitored zones 120.

At block 410, the occupancy detection system 100 can categorize (via, e.g., the data integration module 208) the sensor outputs according to one or more characteristics of the sensor reporting the output (e.g., the sensors 122, 124, etc.). For example, the occupancy detection system 100 can group the sensor outputs according to the data categories 250 of FIG. 2. In some embodiments, the data categories 250 can include at least the first category 252, the second category 254, and/or the third category 256 illustrated in FIG. 2. As described above, the first category 252 can correspond to sensor outputs from one or more of the reporting sensors associated with individual occupants, and the second category 254 can correspond to sensor outputs from public or zone related instances of the sensors (e.g., the environmental sensors described above). In one or more embodiments, the second category 254 can include sub-groupings for the sensor outputs (e.g., the primary set 262 and/or the secondary set 264 of FIG. 2) according to the measurement response delay described above. The third category 256 can correspond to sensor outputs from further instances of public or zone-related instances of the reporting sensors that are configured to estimate the occupancy count. In some embodiments, the third category 256 can include the sensor outputs that are predetermined as being more accurate than the second category 254 in estimating the occupancy count.

The occupancy detection system 100 can derive data subsets from the obtained sensor outputs according to the data categories 250, such as by comparing the identifiers of the reporting device for the sensor outputs to the sensor identifiers in each of the categories. For example, the occupancy detection system 100 can derive the first data subset corresponding to the first category 252, the second data subset corresponding to the second category 254, and/or the third data subset corresponding to the third category 256.

Accordingly, the first data subset can include the sensor outputs that represent presence/absence of one person for each reporting sensor. In some embodiments, the occupancy detection system 100 can derive further groupings of the sensor outputs within the first data subset based on comparing the current location 230 of the reporting devices to the uncovered regions 123. The second data subset can include the sensor outputs that represent environmental and/or ambient conditions in the corresponding monitored zones 120. In some embodiments, the second data subset can include a primary grouping of the sensors outputs that corresponds to the primary set 262 and a secondary grouping of the sensor outputs that correspond to the secondary set 264. For example, the primary grouping can include sensor outputs (e.g., PIR outputs) that have been predetermined to respond faster than a predetermined time threshold, and the secondary grouping can include sensor outputs (e.g., from thermal sensors and/or gas-particulate sensors) that have been predetermined to respond slower than such threshold. The third data subset can include the sensor outputs that represent an estimated number of occupants in the corresponding monitored zones 120. In some embodiments, the third data subset can include device-estimated occupancies (e.g., results from analyzing images/depth maps and/or line-crossing event counts) that each represent a number of persons and/or objects detected by the corresponding reporting sensor (e.g., cameras, radars, lidar devices, and/or line-crossing sensors 128).

As an illustrative example of the above-described grouping/categorization, the obtained sensor outputs can be stored in a database in a data structure that uses two or more dimensions (e.g., horizontal and vertical directions) to organize the stored data. The occupancy detection system 100 can group the sensor outputs according to the monitored zones 120 along one dimension and according to the time stamps along an orthogonal dimension (e.g., a horizontal direction, such as a row for each time). For example, the obtained sensor outputs can be organized such that each column includes outputs from the reporting sensors that are located in a corresponding monitored zone 120 and each row includes outputs corresponding to a time stamp value or a particular time segment. In some embodiments, the occupancy detection system 100 can assign categorization values (by, e.g., adding tags that represent one of the data categories 250) to each of the organized/sorted sensor outputs. As described above, the occupancy detection system 100 can assign the categorization values based on matching identifiers of the reporting sensors and/or the user devices 152 to a predetermined lookup table that maps various device identifiers to the data categories 250.

At block 412, the occupancy detection system 100 (via, e.g., the data integration module 208) can determine occupancy based on integrating the sensor outputs and/or location information from multiple devices (e.g., the reporting sensors and/or the user devices 152) in the selected zone. In some embodiments, as illustrated at block 414, the occupancy detection system 100 can integrate data across/from multiple different devices within each of the data categories 250. For example, as illustrated at block 416, the occupancy detection system 100 can identify one or more key data for each of the zones. The key data can represent results reported by one or more predetermined types of devices for the corresponding monitored zones 120. For example, for the monitored zones 120 identified (e.g., as described above for block 408) as open areas, the key data can include outputs reported by the presence sensors 124 that are each physically attached to a desk or a chair located therein. Also, for the monitored zones 120 identified as conference rooms, the key data can include outputs from the presence sensors and/or the PIR devices each physically attached to a chair located in the conference room. The occupancy detection system 100 can use the key data to access calculation weights used to determine the occupancy count 240. Accordingly, the occupancy detection system 100 can provide greater influence to predetermined sensors in determining the occupancy count 240 for one or more of the monitored zones.

At block 418, for the selected zone, the occupancy detection system 100 can calculate an occupancy estimate for each of the data categories 250 according to the sensor outputs therein. In other words, the occupancy detection system 100 can calculate the occupancy estimates based on integrating the sensor outputs within each category subset. The occupancy detection system 100 can calculate a first-set output using the sensor outputs in the first data subset. Since the first category 252 corresponds to personalized devices, such as the user devices 152 and/or the presence sensors 124 associated with furniture (e.g., chairs and/or desks), each instance of the reporting device can indicate an individual occupant. Accordingly, the occupancy detection system 100 can determine reporting-device counts (e.g., quantities of devices reporting a detection status associated with occupancy) according to device types (e.g., chair-based sensors, desk-based sensors, personal mobile devices, etc.). For example, the occupancy detection system 100 can determine the reporting-device counts based on determining a quantity of the user devices 152 (e.g., mobile phones and/or personalized access cards/tokens) having the current locations 230 located within the selected zone. Also, the occupancy detection system 100 can determine the reporting-device counts based on determining a quantity of chairs, desks, or a combination thereof having the presence sensors 124 reporting an occupant and indicating the current locations 230 (via, e.g., the position locators 130) as being within the selected zone. In some embodiments, the occupancy detection system 100 can implement self-localization of the presence sensors 124. Accordingly, the presence sensors 124 may have predetermined fixed locations that are known/accessible to the occupancy detection system 100, thereby eliminating the need to report the current locations 230 of the presence sensors 124.

Since one occupant can be simultaneously associated with multiple reporting devices, the occupancy detection system 100 can calculate the first-set output based on determining a maximum of the reporting-device counts as the first-set output. For example, the occupancy detection system 100 can calculate the first-set output as the greatest value among the number of user devices 152, the number of chair-based sensors (e.g., the presence sensors 124 and/or the position locators 130 known to be attached to chairs), or the number of desk-based sensors (e.g., the presence sensors 124 and/or the position locators 130 known to be attached to desks) located within the selected zone and reporting occupancy. In some embodiments, the monitored areas may have a chair-based sensor or a desk-based sensor for each working space/zone. Accordingly, the occupancy detection system 100 can calculate the first-set output as the greatest value among (1) the number of user devices or (2) the number of chair-based and desk-based sensors.

In some embodiments, the occupancy detection system 100 can calculate a second-set output for estimating the occupancy according to the second data subset. The occupancy detection system 100 can calculate the second-set output based on analyzing the primary data (corresponding to the primary set 262) and the secondary data (corresponding to the secondary set 264). Because the primary data and the secondary data respond at different rates to changes in occupancy, the occupancy detection system 100 can be configured to track the secondary data over time and calculate the second-set output according to changes across time. For example, since the primary data responds quicker to changes in occupancy, the occupancy detection system 100 can calculate the second-set output based on the primary data when it changes while the secondary data represents unchanged occupancy (e.g., stays constant or within a predetermined change threshold from a previous time). Also, the occupancy detection system 100 can calculate the second-set output based on the secondary data when the secondary data represents a change in occupancy, such as by maintaining a changed level for at least a minimum threshold duration, while the primary data represents unchanged occupancy.

As an illustrative example of processing the secondary data, the occupancy detection system 100 can calculate the secondary data based the primary set (based on, e.g., taking 100% of the maximum capacity) when the primary set reports occupancy event). In some embodiments, for example, the occupancy detection system 100 can calculate the secondary data based on predetermined sets of occupancy thresholds for the reporting sensors that correspond to the secondary set 264. The occupancy thresholds can correspond to a range of sensor readings that are associated with a level/range of occupancy as illustrated in Table 1. The occupancy thresholds can be computed/predetermined based on computer models, manufacturer-provided information (e.g., device specification and/or sensitivity), and/or previous tests or calibrations.

TABLE 1

| Sensor | Unoccupied | Low | Medium | High | Extreme |
|---|---|---|---|---|---|
| $CO_2$ (ppm) | 400-600 | 601-800 | 801-1200 | 1201-2500 | 2501+ |
| Temperature (° C.) | $\Delta < 0.2$ | $0.2 \leq \Delta < 0.5$ | $0.5 \leq \Delta < 1.0$ | $1.0 \leq \Delta < 3.0$ | $\Delta \leq 3.0$ |
| VoC (ppb) | 0-10 | 11-65 | 66-200 | 201-600 | 601+ |
| CO (ppm) | 0-1 | 2 | 3 | 4-10 | 10+ |

For the example illustrated in Table 1, the occupancy detection system 100 can distinguish the readings into five occupancy levels. The unoccupied level can correspond to no occupancy. The low, medium, high, and extreme levels can correspond to different percentages of the maximum capacity 121 for the selected zone, such as 20%, 50%, 80%, and 100%, respectively. In some embodiments, the occupancy thresholds for temperature readings (e.g., outputs from the thermal sensors) can be described as differences from predicted/expected temperatures, such as thermostat settings, average indoor/outdoor temperatures, or a combination thereof. In some embodiments, the occupancy thresholds for gas/particulate sensors (e.g., $CO_2$ sensors, VoC sensors, CO sensors, etc.) can be described as differences from outside air conditions and/or one or more previous reference readings. In some embodiments, the occupancy thresholds for gas/particulate sensors can be based on estimates and/or computer models that estimate/predict the various levels with respect to different occupancy levels given the size, area shape, the air-flow pattern, and/or other physical attributes of the associated area.

Based on the occupancy thresholds, the occupancy detection system 100 can evaluate the second-set output and estimate an occupancy level. For example, the occupancy detection system 100 can compare the secondary data to the occupancy thresholds and determine the corresponding percentage factor. According to the determined percentage factor, the occupancy detection system 100 can scale the maximum capacity 121 to calculate the second-set output.

When multiple environmental sensors (e.g., the thermal sensors 122 microphones, humidity sensors, gas sensors, etc.) report values for the selected zone, the occupancy detection system 100 can calculate the second-set output based on further combining the estimates associated with each reporting sensor, such as by averaging the individual sensor-based estimates or by determining a maximum thereof. In some embodiments, the occupancy detection system 100 can integrate the individual sensor-based estimates according to a size of the selected zone. For example, the occupancy detection system 100 can calculate the second-set output based on averaging the individual sensor-based estimates when the selected zone is larger than a predetermined size limit (e.g., 50 m²), such as for open spaces and/or event rooms. Also, the occupancy detection system 100 can calculate the second-set output as the maximum of the individual sensor-based estimates when the selected zone is smaller than the predetermined size limit, such as for conference rooms, break rooms, offices, etc.

In some embodiments, the occupancy detection system 100 can calculate a third-set output using the sensor outputs in the third data subset. For example, the line-crossing sensors 128 and/or radars/lidar devices/cameras the computer vision mechanisms coupled to can be configured to provide its own occupancy counts (i.e., device-estimated occupancies) in associated areas. As such, the sensors 122, 124, etc. for the third category 256 may be installed to observe non-overlapping areas. Accordingly, the occupancy detection system 100 can calculate the third-set output based on summing the device-estimated occupancies for the selected area. If the devices for the third category 256 are configured to observe overlapping areas, the occupancy detection system 100 can include predetermined identifiers (e.g., image markers and/or depth measures) for the overlapped areas. Using the predetermined identifiers, the occupancy detection system 100 can filter or adjust the third data subset to calculate a number of occupants located within the markers or distance ranges and reduce the total combined occupancy count by the number of occupants in the overlapped area.

At block 420, the occupancy detection system 100 can integrate the sensor outputs across the data categories 250 to determine the occupancy count 240. The occupancy detection system 100 can integrate across the data categories 250 based on selecting and/or combining the outputs/estimates from the data subsets (e.g., the first-set output, the second-set output, and/or the third-set output).

In some embodiments, for example, the occupancy detection system 100 can integrate the sensor outputs from the first and second data subsets based on determining a greater of the first-set output and the second-set output. In other words, when the obtained data for the selected region are reported by the user devices 152 and/or sensors corresponding to the first category 252 and the second category 254, the occupancy detection system 100 can calculate max(T1, T2). T1 represents the first-set output corresponding to an occupancy estimate according to the number of individualized devices/sensors, and T2 represents the second-set output corresponding to an occupancy estimate according to environmental conditions.

Also, when the obtained data for the selected region are reported by the user devices 152 and/or sensors corresponding to the first category 252 and the third category 256, the occupancy detection system 100 can integrate the sensor outputs from the first and third data subsets. The occupancy detection system 100 can integrate the sensor outputs based on determining an uncovered-device quantity. The uncovered-device quantity can represent a quantity of devices associated with the first category 252 that are located in the uncovered regions 123 of the sensors (e.g., areas outside of the sensor range and/or locations outside of field of view or hidden by obstacles) in the third category 256 as described above. The occupancy detection system 100 can determine the uncovered-device quantity by comparing the current location 230 to the uncovered regions 123. In other words, the occupancy detection system 100 can use the first subset of the data to identify the personalized occupancy sensors and/or the user devices 152 located in the uncovered regions 123. For the data reported by the identified sensors and/or the user devices 152, the occupancy detection system 100 can estimate occupancy therein based on counting the number of reporting devices according to types of reporting devices (e.g., mobile phones and/or access cards, chair-based sensors, desk-based sensors, etc.) and then identifying the maximum count ($T1_{uncovered}$) as described above. Accordingly, the occupancy detection system 100 can determine the occupancy count 240 based on combining (e.g., adding) the uncovered-device quantity ($T1_{uncovered}$) and the third-set output (T3).

Also, when the obtained data for the selected region are reported by the user devices 152 and/or sensors corresponding to the second category 254 and the third category 256 the occupancy detection system 100 can integrate the sensor outputs from the second and third data subsets. In some embodiments, the occupancy detection system 100 can integrate the data based on prioritizing the third data subset over the second data subset. In some embodiments, the occupancy detection system 100 can integrate the data in the second and third data subsets based on validating the third-set output according to the second-set output. For example, the occupancy detection system 100 can validate and use the third-set output (T3) when it is less than or equal to the second-set output (T2). If the third-set output exceeds the second-set output, the occupancy detection system 100 can use T2 as the occupancy count, thereby discarding T3, or calculate an average of T2 and T3 for the occupancy count 240.

In one or more embodiments, when the obtained data for the selected region are reported by the user devices 152 and/or sensors corresponding to the first category 252, the second category 254, and the third category 256, the occupancy detection system 100 can integrate the sensor outputs from the first, second, and third data subsets based on a combination of integration processes described above. For example, the occupancy detection system 100 can determine the uncovered-device quantity ($T1_{uncovered}$) as described above, and then determine the occupancy count 240 based on combining/adding the third-set output (T3) and the uncovered-device quantity ($T1_{uncovered}$). In some embodiments, the occupancy detection system 100 can then validate the resulting occupancy count 240 according to the second-set output (T2). When '$T1_{uncovered}$+T3' is less than or equal to T2, the occupancy detection system 100 can determine the occupancy count 240 as '$T1_{uncovered}$+T3.' Otherwise, the occupancy detection system 100 can determine the occupancy count 240 as T2 or an average of '$T1_{uncovered}$+T3' and T2. In some embodiments, the occupancy detection system 100 can prioritize the third-set output (T3) and/or the uncovered-device quantity ($T1_{uncovered}$) over the second-set output (T2). Accordingly, the occupancy detection system 100 can determine the occupancy count 240 as '$T1_{uncovered}$+T3' independent of the second-set output (T2).

At decision block 422, the occupancy detection system 100 can determine whether the selected zone is the last zone according to a predetermined sequence. If the selected zone is not the last zone, the flow can return to block 408 and the occupancy detection system 100 can select the next zone according to the predetermine sequence. If all the monitored zones 120 have been selected and analyzed, i.e., the selected zone of the current iteration is the last zone, the flow can proceed to block 402.

Integrating the real-time sensor outputs (e.g., occupancy-related measurements and/or status) across multiple sensors 122, 124, etc. and/or the user devices 152 provides increased accuracy in determining and tracking occupancies within the building 104. The occupancy detection system 100 can integrate the sensor outputs according to the data categories 250 as described above, such as first within each of the categories and then across the categories. Since the data categories 250 leverage the detection characteristics as described above, the occupancy detection system 100 can combine and use the source outputs to leverage strengths of one measuring device to compensate for deficiencies (e.g., the uncovered regions 123 and/or slow response time) in other devices. The increased accuracy in determining the occupancy count 240 further provides increased accuracy in tracking space/resource usage for the building 104, which can lead to increased efficiency in space/resource assignments and increased accuracy in estimating future needs (e.g., changes in demands).

Figure 5:
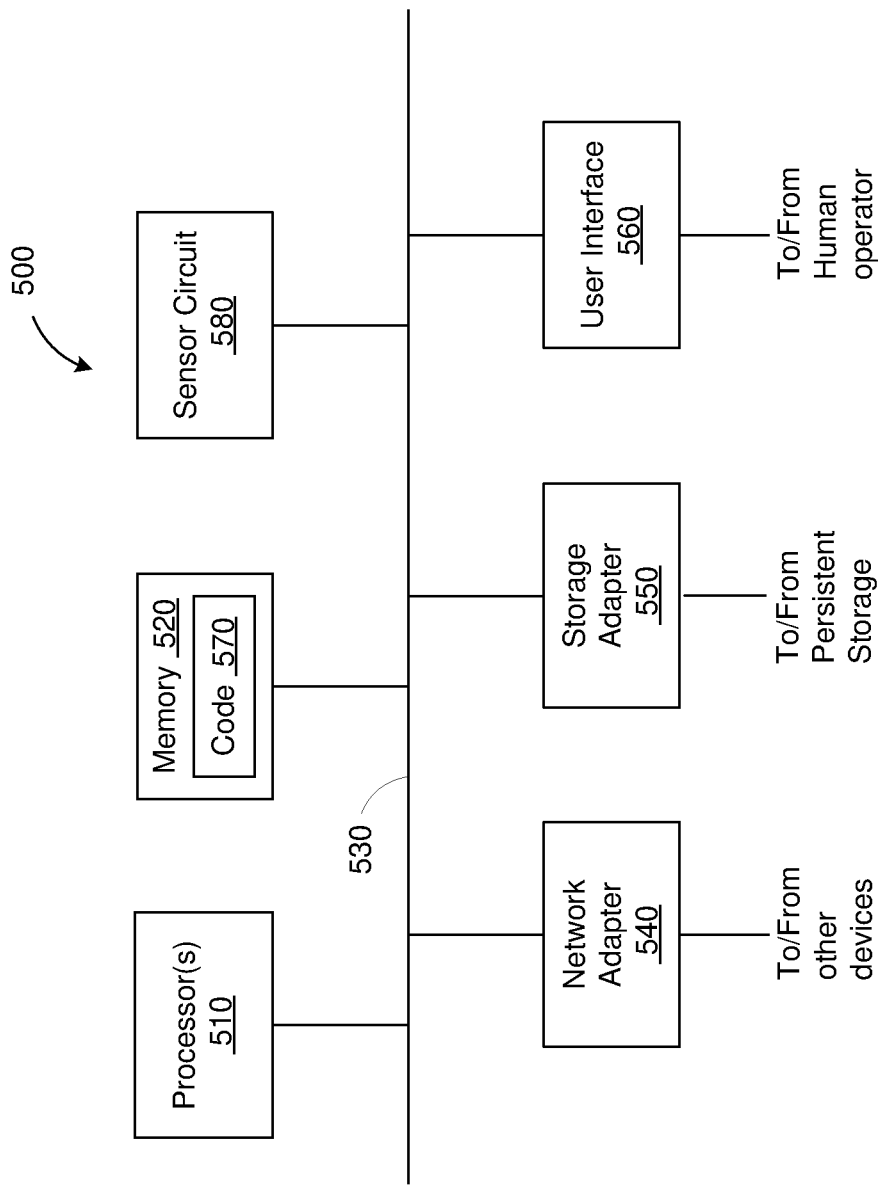
FIG. 5 is a block diagram of an example computing device configured in accordance with some embodiments of the present technology.

FIG. 5 is a block diagram of an example computing device 500 configured in accordance with various embodiments of the present technology. The computing device 500 can represent one or more computing devices (e.g., devices illustrated in FIG. 1, such as the system managing devices 112, the building subsystems or portions thereof, the linking devices 132, the communication nodes 134, the sensors (e.g., the sensors 122, 124, etc. and/or the user devices 152) that implement at least a portion of the process 400 of FIG. 4. The computing device 500 includes one or more processors 510 and memory 520 connected to an interconnect 530. The interconnect 530 is an abstraction that represents any one or more separate physical buses, point-to-point connections, or both connected by appropriate bridges, adapters, or controllers. The interconnect 530, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire". The interconnect 530 can also include wireless connection or communications between components.

The processor(s) 510 is/are the central processing unit (CPU) of the computing device 500 and thus controls the overall operation of the computing device 500. In certain embodiments, the processor(s) 510 accomplishes this by executing software or firmware stored in memory 520. The processor(s) 510 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 520 is or includes the main memory of the computing device 500. The memory 520 represents any form of random access memory (RAM), read-only memory (ROM), flash memory, or the like, or a combination of such devices. In use, the memory 520 may contain a code 570 (e.g., applications, device-specific executables, etc.) containing instructions according to the operation of at least a portion of the process 400 disclosed herein. The code 570 stored in memory 520 may be implemented as software and/or firmware to program the processor(s) 510 to carry out actions described above. In certain embodiments, such software or firmware may be initially provided to the computing device 500 by downloading it from a remote system through the computing device 500 (e.g., via network adapter 540).

Also connected to the processor(s) 510 through the interconnect 530 may be a network adapter 540 and/or a storage adapter 550. The network adapter 540 provides the computing device 500 with the ability to communicate with remote devices, over a network and may be, for example, an Ethernet adapter, Fibre Channel adapter, or a wireless modem. The network adapter 540 may also provide one or more devices in the building 104 of FIG. 1 with the ability to communicate with other computers. The storage adapter 550 enables the computing device 500 to access a persistent storage, and may be, for example, a Fibre Channel adapter or SCSI adapter.

The computing device 500 can further include one or more user interfaces 560 connected to the interconnect 530. The user interfaces 560 can communicate information to a user and/or receive inputs/information from the user. For example, the user interfaces 560 can include a display screen, a speaker, a haptic device, etc. Also, the user interfaces 560 can include a touch screen, a keyboard, a mouse, a microphone, etc. Also, the user interfaces 560 can include one or more GUIs.

In some embodiments, the computing device 500 can include a sensor circuit 580 connected to the interconnect 530. The sensor circuit 580 can measure one or more aspects of the surrounding environment. For example, the sensor circuit 580 can include various sensors described above (e.g., the sensors 310), such as one or more circuits configured to measure/detect thermal energy/temperature, waves (e.g., light, sound, etc.), particles and/or gases, acceleration, magnetic field, device orientation, or a combination thereof.

Overall, the system/process described herein may be implemented for execution by any suitable computing environment in which the invention can be implemented. The system may be implemented by routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, multi-processor systems, microprocessor-based or programmable consumer electronics, set-top boxes, network PCs, mini-computers, mainframe computers, and the like. Indeed, the terms "computer," "server," "host," "host system," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device, the invention can also be practiced in distributed environments where functions or modules are shared among disparate processing devices, which are linked through a network. In a distributed computing environment, program modules may be located in both local and remote memory storage devices.

Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

It is understood that the above described embodiments can be implemented using one or more devices (e.g., processors, Field Programmable Gate Arrays (FPGAs), state machines, memory devices, such as volatile or non-volatile memory, communication devices, such as modems or transceivers, user or device interfaces, or a combination thereof). Further, the discussed embodiments can be implemented in a networked environment. For example, the system can interact with the consumer through a user device (e.g., a personal computer or a laptop computer, a mobile device, etc.), which can be connected to one or more service provider devices (e.g., servers) implementing or executing one or more processes discussed above. The service provider devices can include lender devices or be separately connected to the lender devices (e.g., servers belonging to or operated by the lenders). The various devices can be connected using a communication network (e.g., telephone network, a local area network (LAN), a wide area network (WAN), a cellular network, etc.).

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A tangible, non-transient computer-readable medium having processor instructions encoded thereon that, when executed by one or more processors, configures the one or more processors to:
   obtain data representing readings provided by multiple reporting devices operating in or observing corresponding areas that are (1) within a monitored zone and (2) at least partially overlapping,
      wherein the obtained data corresponds to two or more predetermined data categories representing different types of devices that provided the data,
      wherein the data categories include a first category representing data reported by devices associated with individual occupants and a second category representing data reported by devices related to an area designated to be shared by or accessible to multiple people, and
      wherein the two or more predetermined data categories comprises at least one category representing environmental data provided by at least a subset of the multiple reporting devices;
   calculate an occupancy estimate for each of the data categories based on the obtained data, wherein the occupancy estimate represents a number of people within the observed areas for a corresponding data category,
      wherein the calculated occupancy estimates include (1) a first estimated count based on a subset within the obtained data that belongs to the first category and (2) a second estimated count based on a different subset within the obtained data that belongs to the second category; and
   determine an occupancy count for the monitored zone based on selectively combining the occupancy estimates for the data categories, wherein the occupancy count represents a number of people within the monitored zone,
      wherein the occupancy count is determined by selectively combining the first estimated count and the second estimated count.

2. The tangible, non-transient computer-readable medium of claim 1, wherein:
   the first category includes data reported by (1) user computing devices and (2) presence detection devices associated with personalized equipment each configured to accommodate one user; and
   the first estimated count is calculated based on selecting a greater of quantities for the user computing devices and for the presence detection devices.

3. The tangible, non-transient computer-readable medium of claim 1, wherein:
   the second category represents measurements that respond after a minimum time delay from a change in occupancy;
   the second estimated count is calculated based on (1) storing measurements belonging to the second category over a duration, (2) calculating elapsed times since last changes in the measurements, and (3) selectively updating the second estimated count based on one or more of the elapsed times; and
   the occupancy count is determined according to the one or more of the elapsed times.

4. The tangible, non-transient computer-readable medium of claim 1, wherein determining the occupancy count includes determining the occupancy count as a greater of the first estimated count and the second estimated count.

5. The tangible, non-transient computer-readable medium of claim 1, wherein:
   the second category represents data from environmental sensors; and
   the occupancy count is determined by (1) calculating a difference between the first estimated count and the second estimated count and (2) validating the first estimated count based on the difference.

6. The tangible, non-transient computer-readable medium of claim 5, wherein:
   the data categories include a third category that represents data from sensors configured to estimate occupancy of a sensed region shared or traversed by multiple people and sensed by the sensors;
   the calculated occupancy estimates include (1) a third estimated count that corresponds to measurements in the third category and represents an estimated occupancy in the sensed region and (2) the first estimated count for estimating occupancy in a separate region according to locations of corresponding reporting sensors, wherein the separate region does not overlap the sensed region; and
   the occupancy count is calculated by combining the first and third estimated counts.

7. The tangible, non-transient computer-readable medium of claim 1, wherein:
   the obtained data represents outputs from a thermal sensor, a presence sensor, a motion sensor, a line-crossing sensor, a position locator, a user computing device, an accelerometer, a magnetometer, a gyroscope, a capacitive sensor, a passive infrared (PIR) device, a radar, a lidar, a mmWave sensor, an infrared transmitter-receiver device, a camera, a humidity sensor, a particle sensor, an organic compound sensor, or a combination thereof; and
   the occupancy count represents a number of people or a number of objects within the monitored zone.

8. The tangible, non-transient computer-readable medium of claim 1, wherein the instructions are for:
   identifying a set of monitored zones based on a map, wherein the set of monitored zones represent different spaces within a building and includes the monitored zone;
   computing device locations representing locations of one or more devices within the building and reporting the obtained data;
   grouping the data according to corresponding device locations and the monitored zones; and
   wherein:
   determining the occupancy count includes determining the occupancy count for each of the monitored zones based on the grouped data associated with corresponding monitored zone.

9. The tangible, non-transient computer-readable medium of claim 1, wherein:
   the obtained data includes time stamps; and
   determining the occupancy count includes (1) grouping the obtained data according to the time stamps and (2) determining the occupancy count for a time based on a corresponding grouping of the obtained data.

10. A method of operating system to determine occupancy in a monitored zone, the method comprising:

obtaining data representing readings provided by multiple reporting devices operating in or observing corresponding areas that are (1) within a monitored zone and (2) at least partially overlapping each other,
  wherein the obtained data corresponds to at least first and second data categories representing different types of devices that provided the data,
  wherein the data categories include a first category representing data reported by devices associated with individual occupants and a second category representing data reported by devices related to an area designated to be shared by or accessible to multiple people, and
  wherein the at least first data category represents environmental data provided by at least a subset of the multiple reporting devices;
calculating an occupancy estimate for each of the data categories based on the obtained data, wherein the occupancy estimate represents a number of people within the observed areas for a corresponding data category,
  wherein the calculated occupancy estimates include (1) a first estimated count based on a subset within the obtained data that belongs to the first category and (2) a second estimated count based on a different subset within the obtained data that belongs to the second category; and
determining an occupancy count for the monitored zone based on selectively combining the occupancy estimates for the data categories,
  wherein the occupancy count is determined by selectively combining the first estimated count and the second estimated count.

11. The method of claim 10, wherein:
the data categories include a third category that represents data from sensors configured to estimate occupancy of a sensed region shared or traversed by multiple people and sensed by the sensors;
the calculated occupancy estimates include (1) a third estimated count that corresponds to measurements in the third category and represents an estimated occupancy in the sensed region and (2) the first estimated count for estimating occupancy in a separate region according to locations of corresponding reporting sensors, wherein the separate region does not overlap the sensed region; and
the occupancy count is calculated by (1) combining the first and third estimated counts and (2) verifying one or more of the calculated occupancy estimates and/or a derivation thereof using the second estimated count.

12. The method of claim 10, wherein the obtained data represents outputs from a thermal sensor, a presence sensor, a motion sensor, a line-crossing sensor, a position locator, a user computing device, an accelerometer, a magnetometer, a gyroscope, a capacitive sensor, a passive infrared (PIR) device, a radar, a lidar, a mmWave sensor, an infrared transmitter-receiver device, a camera, a humidity sensor, a particle sensor, an organic compound sensor, or a combination thereof.

13. The method of claim 10, wherein:
the obtained data includes time stamps; and
determining the occupancy count includes (1) grouping the obtained data according to the time stamps and (2) determining the occupancy count for a time based on a corresponding grouping of the obtained data.

14. A system for determining occupancy in a monitored zone, the system comprising:

at least one computer-based processor; and
at least one computer-based memory operably coupled to the computer-based processor and having stored thereon instructions executable by the computer-based processor to cause the computer-based processor to:
obtain data representing readings provided by multiple reporting devices operating in or observing corresponding areas that are (1) within a monitored zone and (2) at least partially overlapping,
  wherein the obtained data corresponds to two or more predetermined data categories representing different types of devices that provided the data,
  wherein the data categories include a first category representing data reported by devices associated with individual occupants and a second category representing data reported by devices related to an area designated to be shared by or accessible to multiple people, and
  wherein the two or more predetermined data categories comprises at least one category representing environmental data provided by at least a subset of the multiple reporting devices;
calculate an occupancy estimate for each of the data categories based on the obtained data, wherein the occupancy estimate represents a number of people within the observed areas for a corresponding data category,
  wherein the calculated occupancy estimates include (1) a first estimated count based on a subset within the obtained data that belongs to the first category and (2) a second estimated count based on a different subset within the obtained data that belongs to the second category; and
determine an occupancy count for the monitored zone based on selectively combining the occupancy estimates for the data categories,
  wherein the occupancy count is determined by selectively combining the first estimated count and the second estimated count.

15. The system of claim 14, wherein:
the data categories include a third category that represents data from sensors configured to estimate occupancy of a sensed region sensed by the sensors and shared or traversed by multiple people and sensed by the sensors;
the calculated occupancy estimates include (1) a third estimated count that corresponds to measurements in the third category and represents an estimated occupancy in the sensed region and (2) the first estimated count for estimating occupancy in a separate region according to locations of corresponding reporting sensors, wherein the separate region does not overlap the sensed region; and
the occupancy count is calculated by (1) combining the first and third estimated counts and (2) verifying one or more of the calculated occupancy estimates and/or a derivation thereof using the second estimated count.

16. The system of claim 14, wherein the obtained data represents outputs from a thermal sensor, a presence sensor, a motion sensor, a line-crossing sensor, a position locator, a user computing device, an accelerometer, a magnetometer, a gyroscope, a capacitive sensor, a passive infrared (PIR) device, a radar, a lidar, a mmWave sensor, an infrared transmitter-receiver device, a camera, a humidity sensor, a particle sensor, an organic compound sensor, or a combination thereof.

17. The system of claim 14, wherein:
the obtained data includes time stamps; and the occupancy count is determined based on (1) grouping the obtained data according to the time stamps and (2) determining the occupancy count for a time based on a corresponding grouping of the obtained data.

\* \* \* \* \*